US010235102B2

(12) United States Patent
Richter et al.

(10) Patent No.: US 10,235,102 B2
(45) Date of Patent: Mar. 19, 2019

(54) METHODS, SYSTEMS AND COMPUTER READABLE MEDIA FOR SUBMISSION QUEUE POINTER MANAGEMENT

(71) Applicant: SanDisk Technologies LLC, Plano, TX (US)

(72) Inventors: Elkana Richter, Tene-Omarim (IL); Shay Benisty, Beer Sheva (IL); Tal Sharifie, Lehavim (IL)

(73) Assignee: SanDisk Technologies LLC, Addison, TX (US)

( * ) Notice: Subject to any disclaimer, the term of this patent is extended or adjusted under 35 U.S.C. 154(b) by 290 days.

(21) Appl. No.: 14/929,387

(22) Filed: Nov. 1, 2015

(65) Prior Publication Data

US 2017/0123667 A1 May 4, 2017

(51) Int. Cl.
*G06F 3/00* (2006.01)
*G06F 3/06* (2006.01)
*G06F 13/42* (2006.01)

(52) U.S. Cl.
CPC ............ *G06F 3/0679* (2013.01); *G06F 3/061* (2013.01); *G06F 3/0659* (2013.01); *G06F 13/42* (2013.01)

(58) Field of Classification Search
CPC .... G06F 3/0604; G06F 3/0629; G06F 3/0679; G06F 3/061; G06F 13/4282; G06F 3/0655; G06F 3/0659; G06F 3/0619; G06F 3/0688
See application file for complete search history.

(56) References Cited

U.S. PATENT DOCUMENTS

| | | | | |
|---|---|---|---|---|
| 6,055,579 A * | 4/2000 | Goyal | ................... | G06F 9/4881 712/28 |
| 6,323,867 B1 * | 11/2001 | Nookala | ................ | G06F 9/3879 345/522 |
| 6,330,628 B1 * | 12/2001 | Motoyama | ................ | G06F 3/12 358/1.15 |
| 9,128,615 B2 * | 9/2015 | Benisty | ................. | G06F 3/0659 |
| 2006/0143373 A1 * | 6/2006 | Jain | ..................... | H04L 45/7453 711/108 |
| 2015/0186068 A1 * | 7/2015 | Benisty | ................. | G06F 3/0673 711/154 |
| 2015/0248366 A1 * | 9/2015 | Bergsten | ............. | H04L 67/1097 710/308 |

(Continued)

OTHER PUBLICATIONS

"NVM express specification 1.2", NVMepress.org, Nov. 3, 2013.*

(Continued)

*Primary Examiner* — Francisco A Grullon
(74) *Attorney, Agent, or Firm* — Vierra Magen Marcus LLP

(57) ABSTRACT

Methods, systems, and computer readable media for submission queue pointer management are disclosed. One method is implemented in a data storage device including a controller and a memory. The method includes fetching a plurality of commands from a submission queue. The method further includes parsing at least one of the commands. The method further includes, in response to successful parsing of at least one of the commands and prior to executing all of the commands, notifying a host to advance a head entry pointer for the submission queue by a number of entries corresponding to a number of the commands successfully parsed.

20 Claims, 5 Drawing Sheets

(56) References Cited

U.S. PATENT DOCUMENTS

| | | | |
|---|---|---|---|
| 2015/0304423 A1* | 10/2015 | Satoyama | H04L 67/1097 709/223 |
| 2016/0026388 A1* | 1/2016 | Jeong | G06F 3/061 711/103 |
| 2016/0117119 A1* | 4/2016 | Kim | G06F 13/1642 711/103 |
| 2016/0224248 A1* | 8/2016 | Choi | G06F 3/0604 |
| 2016/0357481 A1* | 12/2016 | Nam | G06F 3/0619 |
| 2017/0052912 A1* | 2/2017 | Canepa | G06F 13/364 |
| 2017/0102874 A1* | 4/2017 | Ouchi | G06F 3/061 |

OTHER PUBLICATIONS

"Implementing a Queue using a circular array" Emory College, CS 171, Dec. 20, 2013.*

Livny, Isaac. "Storage over PCIe® Design and Validation Techniques." Flash Memory Summit. 2013.*

Marks, Kevin. "An NVM Express Tutorial." Flash Memory Summit. 2013.*

Ellefson, Janene. "NVM Express: Unlock Your Solid State Drives Potential." Flash Memory Summit. 2013.*

Schoenecker, Don. "PCIE Protocol Analysis for SSDS." DesignCon. 2015.*

* cited by examiner

METHODS, SYSTEMS AND COMPUTER READABLE MEDIA FOR SUBMISSION QUEUE POINTER MANAGEMENT

TECHNICAL FIELD

The subject matter described herein relates to storage devices, such as nonvolatile memory devices. More particularly, the subject matter described herein relates to pointer management in host side submission queues by a storage device in a manner that improves overall system performance.

BACKGROUND

In the nonvolatile memory express (NVMe) system, a host device writes data storage device commands, such as read commands, write commands, and administrative commands, in submission queues, which are implemented in host memory. The nonvolatile storage device fetches the commands from the submission queues, executes the commands, and places entries in completion queues, which are also implemented in host memory, to notify the host of completion of the commands.

When the host places new commands for a nonvolatile storage device in a submission queue, the host updates a tail entry pointer in the submission queue to point to the next available entry that is not currently filled with a command. When the storage device removes commands from a submission queue, the storage device updates a head entry pointer to point to the next command that has not been read. According to the NVMe standard, the current version of which is NVM Express, Revision 1.2, Nov. 3, 2014 (hereinafter, "NVMe Standard"), the disclosure of which is incorporated herein by reference in its entirety, "The consumer increments the Head entry pointer after retrieving the next entry from the queue." (See NVMe Standard, Section 4.1.) The consumer of submission queue entries is the storage device. If this passage is read to mean that the storage device must inform the host after each command is retrieved from a submission queue, but before the command is successfully parsed by the storage device controller, the following error scenario could occur. If the command is not properly transmitted over the PCIe bus to the storage device and is unparseable by the storage device, it would be desirable for the storage device to be able to re-fetch the command from the submission queue. However, if the storage device informed the host to update the submission queue entry head pointer upon retrieval of the command, then the host is permitted to overwrite the submission queue entry with a new command. Because the previous command can be overwritten once the host is notified to advance the submission queue head entry pointer, the command in the previous location of the head entry pointer cannot be considered valid. There is no ability to re-fetch a command from a host side submission queue after the storage device has informed the host device to advance the submission queue head entry pointer upon fetching of the command.

One possible solution to this problem would be to only update the submission queue head entry pointer after all commands associated with a fetch operation are successfully executed by the storage device. However, such a solution may result in undesirable host side latency. For example, suppose the storage device retrieves five commands from a submission queue, quickly executes four of the commands, takes a long time to execute fifth command, and waits until all five commands have successfully executed to inform the host to advance the head entry pointer for the submission queue. The host is prevented from writing new commands to the submission queue entries for the first four commands even after the commands have been successfully executed, which could result in host device latency if the submission queue is full and the host is forced to wait for the head entry pointer to advance and before placing a new entry in the submission queue.

Accordingly, there exists a need for methods, systems, and computer readable media submission queue pointer management.

SUMMARY

Methods, systems, and computer readable media for submission queue pointer management are disclosed. One method is implemented in a data storage device including a controller and a memory. The method includes fetching a plurality of commands from a submission queue. The method further includes parsing at least one of the commands. The method further includes, in response to successful parsing of at least one of the commands but prior to executing all of the commands, notifying a host to advance a head entry pointer for the submission queue by a number of entries corresponding to a number of the commands successfully parsed.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
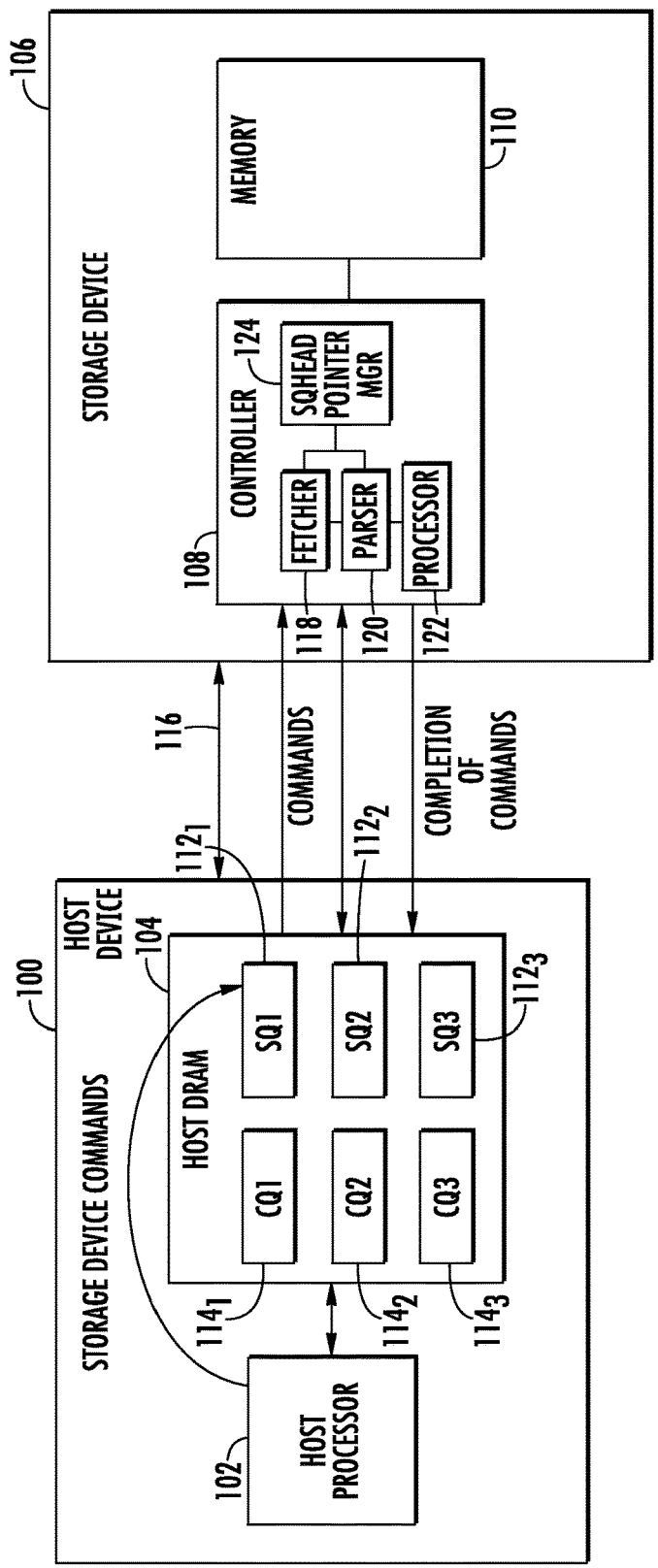
FIG. 1 is a block diagram illustrating a host device and a nonvolatile storage device where the storage device implements submission queue pointer management according to an embodiment of the subject matter described herein.

As stated above, according to the NVMe Standard, a host device communicates memory device commands, such as read commands, write commands, and admin commands, to a nonvolatile storage device using submission queues. FIG. 1 illustrates the NVMe architecture in which the subject matter described herein for submission queue pointer management may be implemented. In FIG. 1, host device 100 may be any suitable computing platform that is capable of accessing memory on a storage device. For example, host device 100 may be a desktop personal computer, a laptop computer, a tablet computer, a mobile telephone, or a front end to a storage array. Host device 100 includes a processor 102 and memory 104, which in the illustrated example is DRAM. Host device 100 may store data in storage device 106. Storage device 106 may be any suitable device that provides nonvolatile memory storage for host device 100. Storage device 106 may be a removable storage device, such as a solid state drive (SSD) that is removably connectable to host device 100. In an alternate example, storage device 106 may be non-removable or integrated within host device 100.

Storage device 106 includes a controller 108 and nonvolatile memory 110. Controller 108 controls access to nonvolatile memory 110. In one embodiment, controller 108 may be a nonvolatile memory controller that implements or supports the NVMe protocol, and nonvolatile memory 110 may be 2D or 3D NAND flash memory.

In order for host device 100 to read data from or write data to storage device 106, processor 102 of host device 100 creates and writes commands in submission queues $112_1$, $112_2$, and $112_3$. Three submission queues are shown for illustrative purposes. It is understood that there may be more or fewer than three submission queues at any given time depending on NVMe device usage by the host system. Controller 108 fetches the commands from submission queues $112_1$, $112_2$, and $112_3$ and executes the commands. Upon completion of the commands, Controller 108 writes completion entries to completion queues $114_1$, $114_2$, and $114_3$.

In order to execute commands, controller 108 must fetch the commands from host device 100 via a bus 116. In the PCIe architecture, bus 116 may be the PCIe bus. The component of controller 108 that performs command fetching is illustrated in FIG. 1 as command fetcher 118. Once a command is fetched, controller 108 must parse the command to identify the operation requested by host device 100. The component of controller 108 that performs command parsing is illustrated as command parser 120 in FIG. 1. Once the command is successfully parsed, the command must be processed. The component of controller 108 that processes commands is illustrated in FIG. 1 as command processor 122.

It is desirable to determine the optimal time to update a submission queue head pointer in a manner that allows commands that are not successfully parsed by storage device 106 to be re-fetched and that does not result in unnecessary host latency. The component of controller 108 that performs submission queue at entry pointer management is illustrated in FIG. 1 as submission queue head entry pointer update manager 124. The operation of submission queue head entry pointer update manager 124 will be described in detail below.

Figure 2:
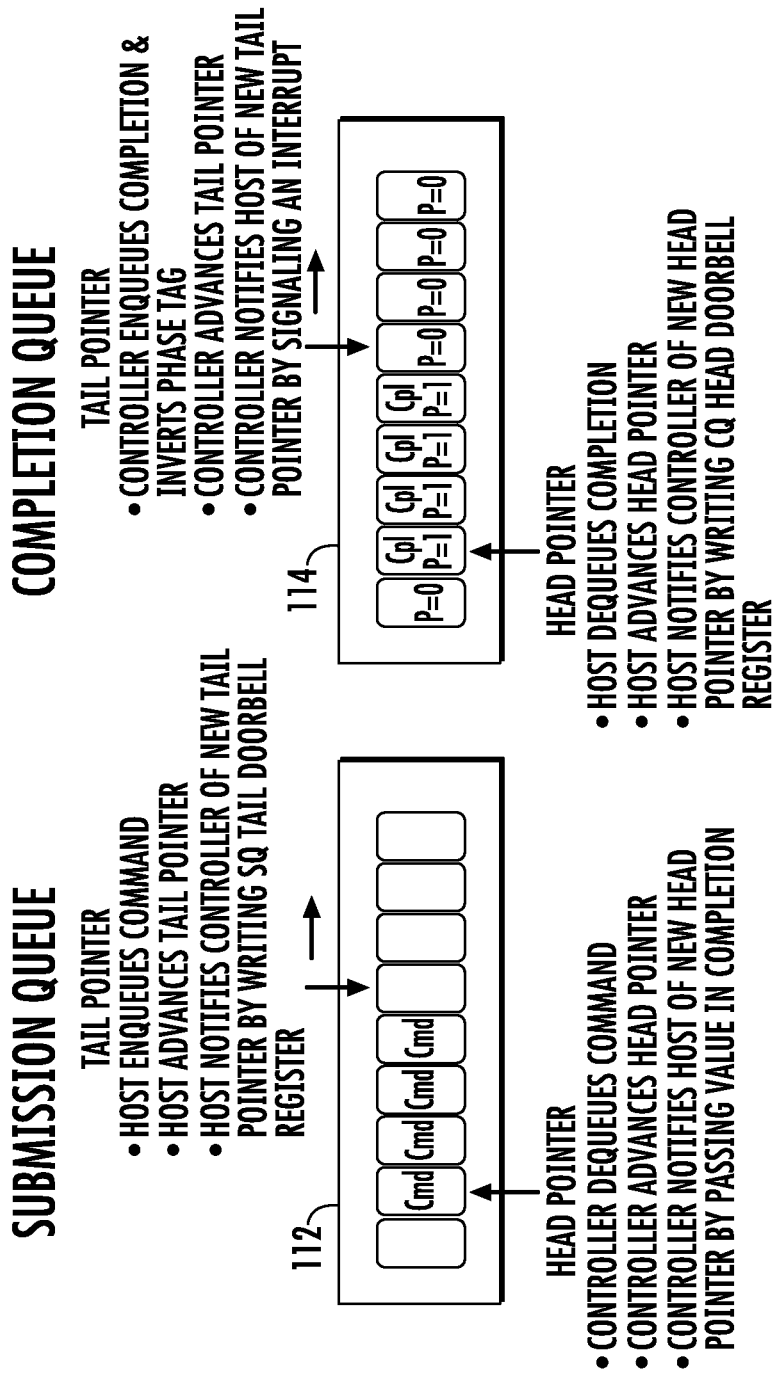
FIG. 2 is a block diagram illustrating submission queue and completion queue pointers.

FIG. 2 illustrates an example of a submission queue, a completion queue, and the associated head and tail pointers. In FIG. 2, submission queue 112 stores commands received from the host. When the host enqueues a command in the submission queue, the host advances the tail pointer. The host notifies storage device 106 of the tail pointer by writing the new pointer value to a submission queue tail doorbell register.

When controller 108 dequeues a command from submission queue 112, it is the responsibility of controller 108 to advance the submission queue head pointer. Controller 108 informs host device 100 of new values for the head pointer in command completions that are written to completion queue 114. The timing of updating of the submission queue head pointer in order to achieve optimal host performance and allow re-fetching of commands that are not correctly parsed by the storage device may be performed by submission queue head entry pointer update manager 124.

In FIG. 2, completion queue 114 also includes a head pointer and a tail pointer. Although the updating of these pointers is not part of the subject matter described herein, their operation will be described for completeness. When the controller completes a command, the controller enqueues a command completion in completion queue 114 and inverts the phase tag. The controller then advances the tail pointer and notifies the host of a new tail pointer by signaling an interrupt. The host removes command completions from completion queue 114 and advances the head pointer. The host notifies the controller of the new head pointer by writing the completion queue head doorbell register. Table 1 shown below illustrates the various pointers and the entity responsible for updating the pointers.

TABLE 1

Submission/Completion Queue Consumption Model

| Pointer | SQ | CQ |
| --- | --- | --- |
| Head | Device | Host |
| Tail | Host | Device |

In Table 1, for the submission queue, the storage device updates the head pointer and the host device updates the tail pointer. For a completion queue, the host device updates the head pointer and the storage device updates the tail pointer.

As stated above, if the storage device notifies the host device to advance the submission queue head pointer when a command is fetched, the host device may erase the command and thus re-fetching of the command may not be possible in the event of a transmission error. In addition, if the storage device waits until a command is executed before updating the submission queue head entry pointer, host resources would be wasted for the time that the host device is forced to wait to reuse the entry corresponding to a successfully parsed but unexecuted command.

Figure 3:
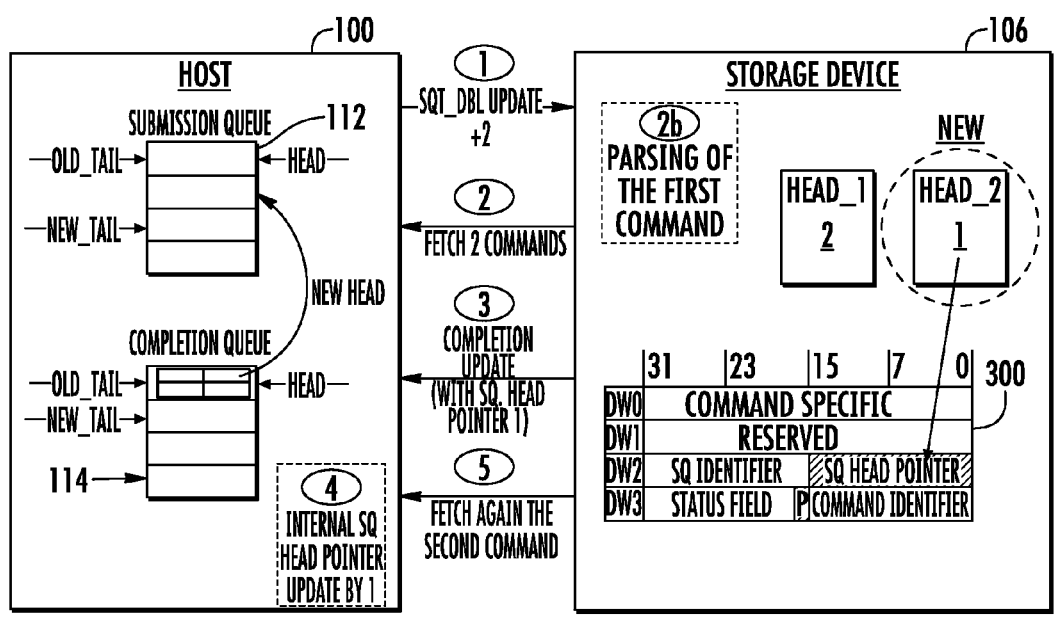
FIG. 3 is a block diagram illustrating re-fetching of a submission queue command according to an embodiment of the subject matter described herein.

According to an aspect of the subject matter described herein, submission queue head entry pointer update manager 124 may update a submission queue head entry pointer when a command is successfully parsed by the host and in some cases prior to the execution of the command by the storage device. FIG. 3 illustrates an example of submission queue head entry pointer management according to an embodiment of the subject matter described herein. Referring to FIG. 3, a single submission queue 112 and a single completion queue 114 are shown on host device 100. Storage device 106, rather than maintaining a single head entry pointer maintains two head entry pointers, head_1 and head_2. It is understood that the operations illustrated in FIG. 3 may be performed by submission queue head entry pointer update manager 124 illustrated in FIG. 1. Head entry pointer head_1 is updated by storage device 106 each time a command is fetched from host device 100 it indicates the next entry in submission queue 112 to read from. In other words, head entry pointer head_1 indicates where the next command should be fetched. Head entry pointer head_1 is preferably internal to storage device 106 and is not visible to host device 100.

The pointer head_2 indicates the location of the next command that has not been successfully parsed by the device. The pointer head_2 follows the pointer head_1 provided that the command is eventually successfully parsed by the device. That is, storage device 106 updates pointer head_2 when a command is successfully parsed. Storage device 106 communicates the pointer head_2 to host device 100 via a completion entry for an associated command, a portion of which is illustrated by double words DW0-DW3 illustrated in FIG. 3. In FIG. 3, the completion entry 300 is provided by storage device 106 to host device 100 upon completion of a command by storage device 106. Completion entry 300 includes a submission queue head pointer, which stores the value of the pointer head_2, which is updated according to the number of commands successfully parsed by storage device 106.

Referring to the message flow illustrated in FIG. 3, in step 1, host device updates the submission queue doorbell register to indicate that two commands are present in submission queue 112. In step 2, storage device 106 fetches the two commands from submission queue 112. Storage device 106 may update the value of the pointer head_1 to indicate the number of commands fetched but maintains the value of head_1 internally without communicating the value of headl_1 to the host. In step 2b, storage device 106 successfully parses the first command and executes the first command. Storage device may update the value of the pointer head_2 to indicate that one command has been successfully parsed. At this point, it is assumed that storage device 106 has not successfully parsed the second command. In step 3, storage device 106 sends a completion entry to host device 100 indicating completion of the first command and an indication to update the head entry pointer by one command or entry via the value of the pointer head_2. It should be noted that the pointer head_1 is not equal to the value of pointer head_2 because two commands have been fetched but only one has been parsed.

In step 4, host device 100 updates the submission queue head entry pointer by one based on the command completion received from storage device 106. Because the second command is not successfully parsed by storage device 106, in step 5, storage device 106 re-fetches the second command from host device 100. Re-fetching the second command may include transmitting a request from storage device 106 to host device 100 identifying the submission queue and the submission queue head pointer value head_2. The second command can be re-fetched because the submission queue head entry pointer has not advanced beyond the entry for the second command. However, the host is free to use the submission queue entry corresponding to the first command even though the second command has not been completed. Thus, the subject matter described herein allows re-fetching of commands when commands are not successfully parsed by a storage device and also reduces host latency in waiting for submission queue entries to become available.

Figure 4:
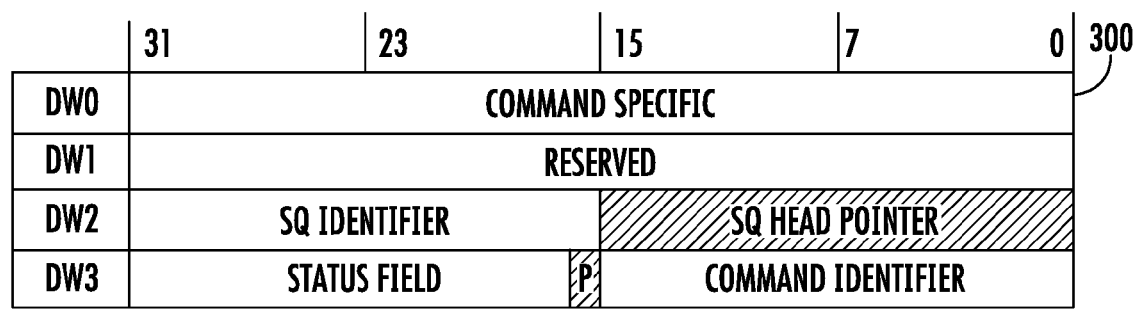
FIG. 4 is a diagram illustrating an example of a completion queue entry.

FIG. 4 illustrates the structure of a command completion that may be transmitted by storage device 106 upon completion of a command in more detail. In FIG. 4, completion queue entry 300 includes four double words DW0-DW3. DW0 is command specific. DW1 is reserved. DW2 contains an identifier for the submission queue to which the entry pertains, as multiple submission queues can correspond to a single completion queue. DW2 also contains the submission queue head pointer, which, according to the subject matter described herein, stores the value of head_2, which is indicative of commands successfully parsed by the storage device. DW3 contains a status field, which identifies the status of completion of the command (i.e., with or without error) and an identifier that specifies the command type. It should be noted that the submission queue head pointer can be included in any command completion (I/O or admin) transmitted from the storage device to the host.

Figure 5:
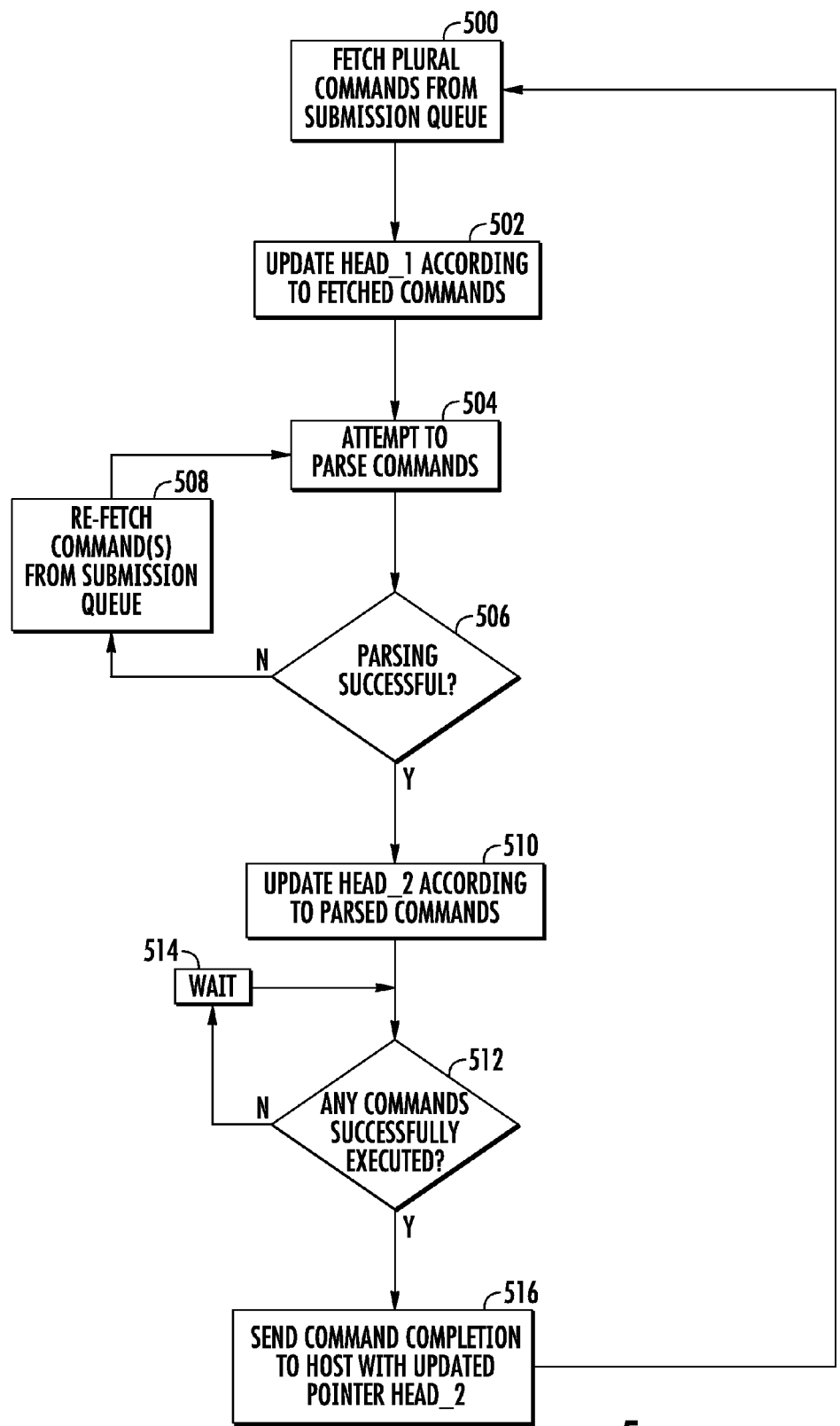
FIG. 5 is a flow chart illustrating an exemplary process for submission queue pointer management according to an embodiment of the subject matter described herein.

FIG. 5 is a flow chart illustrating an exemplary process for submission queue pointer management according to an embodiment of the subject matter described herein. Referring to FIG. 5, in step 500, plural commands are fetched from a submission queue. For example, command fetcher 118 may fetch commands from any one of a number of submission queues 112. In step 502, submission queue head entry pointer update manager 124 updates the value of the pointer head_1 based on the number of commands fetched from the submission queue. Head_1 is maintained internally by storage device 106 and not communicated to host device 100. In step 504, parsing of the commands is attempted and it is determined whether the parsing is successful. Step 504 may be implemented by command parser 120 illustrated in FIG. 1. If command parsing yields a valid storage device command with valid values for all data fields, parsing may be determined to be successful. If command parsing results in an invalid storage device command or contains one or more fields with invalid values, parsing may be determined to be unsuccessful.

In step 506, it is determined whether parsing of any of the commands is successful. If parsing is not successful, control proceeds to step 508 where the unsuccessfully parsed command or commands are re-fetched from the submission queue. Control then returns to step 504 where parsing is reattempted.

If parsing of at least one of the commands is successful, control proceeds to step 510 where the head pointer head_2 is updated according to the number of successfully parsed commands. Control then proceeds to step 512 where it is determined whether any commands have been successfully executed by storage device 106. Because command completion is the communication mechanism for updating the submission queue head pointer, if no commands have been successfully executed, the process waits in step 514 until at least one of the commands has been successfully executed. Once a command has been successfully executed, control proceeds to step 516 where a command completion is sent to the host with the updated pointer head_2. As stated above, the pointer head_2 stores an indication of how much to update the submission queue head entry based on the number of commands successfully parsed by the device. Control then returns to step 500 where new commands are fetched from the submission queue.

Thus, the device controller updates the host with a new value of the submission queue head pointers in some cases before a command is actually executed but after a command is successfully parsed with no errors. Such intelligent submission queue head pointer updating enables re-use of entries in the submission queue before storage device 106 has actually executed the commands. This mechanism will also allow the storage device to hold an internal buffer of parsed commands which could reduce the needed size of the host submission queue. By placing intelligent submission queue head pointer management on the storage device, host operation is simplified and submission queue utilization is improved.

Submission queue pointer management according to the subject matter described herein also improves utilization of nonvolatile storage devices by allowing the device to re-fetch commands when a transmission error occurs. Submission queue pointer management may also improve host device performance by allowing submission queue entries to be overwritten as soon as notification of successful command parsing is received from the storage device. As a result, the likelihood of the host having to wait to place commands in a submission queue is reduced over an implementation that requires that a command be executed before being removed from a submission queue.

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

Although the subject matter described herein for submission queue pointer management is described with respect to the NVMe protocol, the subject matter described herein is not limited to the NVVMe protocol. Submission queue pointer management as described herein can be used with any system where one entity posts commands to one or more queues (submission queues), a second entity consumes the commands, and it is the responsibility of the second entity to update the head entry pointer for the one or more queues.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
   fetching, by a controller of a data storage device including the controller and a memory, a plurality of N commands from a submission queue of a host;
   parsing by the controller of the N fetched commands; and
   in response to successfully parsing the N fetched commands and executing one or more but less than all of the N parsed commands, notifying of the host by the controller that the N commands were successfully executed.

2. The method of claim 1 comprising maintaining by the controller of a first submission queue head entry pointer corresponding to a number of the commands fetched from the submission queue by the controller.

3. The method of claim 2 comprising maintaining by the controller of a second submission queue head entry pointer corresponding to the number of the commands successfully parsed by the controller.

4. The method of claim 3, further comprising: notifying the host to advance the second submission queue head entry pointer by a number of entries corresponding to the number of the commands successfully parsed, including communicating a value of the second submission queue head entry pointer to the host.

5. The method of claim 4 wherein communicating the value of the second submission queue head entry pointer to the host includes inserting the second submission queue head entry pointer in a message to be transmitted by the controller to the host in response to completion of execution of one of the commands by the controller.

6. The method of claim 5 comprising, in response to unsuccessful parsing of one of the commands, re-fetching maintaining by the controller of the one command from the host.

7. The method of claim 6 wherein re-fetching the one command from the host comprises requesting the one command from the host before notifying the host to advance the second submission queue head entry pointer beyond an entry for the one command.

8. The method of claim 1 wherein the data storage device comprises a nonvolatile memory device and the controller comprises a nonvolatile memory controller.

9. The method of claim 1 wherein the memory comprises two dimensional or three dimensional NAND flash memory.

10. A data storage device comprising:
    a memory; and
    a memory controller configured to:
      fetch a plurality of N commands from a submission queue of a host;
      parse the N fetched commands;
      process the parsed commands; and
      in response to successfully parsing the N fetched commands and executing one or more but less than all of the N parsed commands, notify the host that the N commands were successfully executed.

11. The data storage device of claim 10, wherein the memory controller is further configured to maintain a first submission queue head entry pointer corresponding to a number of the commands fetched from the submission queue of the host.

12. The data storage device of claim 11, wherein the memory controller is further configured to maintain a second submission queue head entry pointer corresponding to a number of the commands successfully parsed.

13. The data storage device of claim 12, wherein the memory controller is further configured to notify the host to advance the second submission queue head entry pointer by a number of entries corresponding to the number of the commands successfully parsed by communicating a value of the second submission queue head entry pointer to the host.

14. The data storage device of claim 13, wherein the memory controller is further configured to communicate the value of the second submission queue head entry pointer to the host by inserting the second submission queue head entry pointer in a message transmitted by the memory controller to the host in response to completion of execution of one of the commands.

15. The data storage device of claim 14, wherein the memory controller is further configured to, in response to unsuccessful parsing of one of the commands, re-fetch the one command from the host.

16. The data storage device of claim 15, wherein the memory controller is further configured to request the one command from the host before notifying the host to advance the second submission queue head entry pointer beyond an entry for the one command.

17. The data storage device of claim 10 wherein the data storage device comprises a nonvolatile memory device and a nonvolatile memory controller.

18. The data storage device of claim 10 wherein the memory comprises two dimensional or three dimensional NAND flash memory.

19. A non-transitory computer readable medium having stored thereon executable instructions that when executed by a processor of a computer control the computer to perform steps comprising:
    fetching, by a controller of a data storage device, a plurality of N commands from a submission queue of a host;
    parsing by the controller of the N fetched commands; and
    in response to successfully parsing the N fetched commands and executing one or more but less than all of the N parsed commands, notifying of the host by the controller that the N commands were successfully executed.

20. An apparatus, comprising:
a nonvolatile memory; and
a nonvolatile memory controller configured to fetch and parse a plurality of commands from a host, and, in response to successfully parsing the plurality of fetched commands and executing one or more but less than all of the parsed commands, notify the host that the plurality of commands were successfully executed.

* * * * *